(12) United States Patent
Price et al.

(10) Patent No.: US 7,922,871 B2
(45) Date of Patent: Apr. 12, 2011

(54) RECYCLING CARBON FIBRE (75) Inventors: Roy Price, Henley-in-Arden (GB); John Davidson, Ross-Shire (GB)

(73) Assignee: Recycled Carbon Fibre Limited, Dudley (GB)

( * ) Notice: Subject to any disclaimer, the term of this patent is extended or adjusted under 35 U.S.C. 154(b) by 0 days.

(21) Appl. No.: 12/669,425

(22) PCT Filed: Jan. 19, 2009

(86) PCT No.: PCT/EP2009/050564
§ 371 (c)(1),
(2), (4) Date: Mar. 5, 2010

(87) PCT Pub. No.: WO2009/090264
PCT Pub. Date: Jul. 23, 2009

(65) Prior Publication Data
US 2010/0189629 A1    Jul. 29, 2010

Related U.S. Application Data (60) Provisional application No. 61/021,953, filed on Jan. 18, 2008.

(30) Foreign Application Priority Data

Jan. 18, 2008  (GB) .................................. 0800940.9

(51) Int. Cl.
*C10B 57/12*   (2006.01)
(52) U.S. Cl. ............... 201/36; 201/25; 201/28; 585/241
(58) Field of Classification Search ............... 201/1, 36, 201/28, 25; 585/241; 110/185, 188, 341, 110/348
See application file for complete search history.

(56) References Cited

U.S. PATENT DOCUMENTS 3,476,703 A    11/1969   Wadsworth et al.
(Continued)

FOREIGN PATENT DOCUMENTS

DE    28 10 043 A1    9/1979
(Continued)

OTHER PUBLICATIONS

U.S. Environmental Protection Agency, "Chapter VI: Low-Temperature Thermal Desorption", How to Evaluate Alternative Cleanup Technologies for Underground Storage Tank Sites: A Guide for Corrective Action Plan Reviewers, http://www.epa.gov/oust/pubs/tums.htm, Oct. 1994, 34 pages.

(Continued)

*Primary Examiner* — N. Bhat
(74) *Attorney, Agent, or Firm* — Oblon, Spivak, McClelland, Maier & Neustadt, L.L.P.

(57) ABSTRACT

A method of recycling composite material comprising carbon fibers and a resin, the method comprising: providing a furnace comprising at least a heating portion; providing a transporter for transporting the composite material through the furnace; loading the composite material on the transporter and transporting the composite material through the furnace; detecting a percentage of oxygen in an atmosphere in the heating portion when the composite material has entered this portion; and removing resin from the composite material, as it travels through the heating portion of the furnace on the transporter, by means of chemical decomposition at a first temperature, with the resultant generation of fumes; wherein the generated fumes are removed from the heating portion in a controlled manner, such that the percentage of oxygen in the atmosphere in the heating portion is controlled.

19 Claims, 4 Drawing Sheets

U.S. PATENT DOCUMENTS

| | | | |
|---|---|---|---|
| 3,554,168 A | 1/1971 | Woebcke | |
| 3,642,513 A | 2/1972 | Sach et al. | |
| 3,993,788 A | 11/1976 | Longenecker | |
| 4,005,981 A | 2/1977 | Turnbull | |
| 4,128,394 A | 12/1978 | Naito et al. | |
| 4,276,120 A | 6/1981 | Lutz | |
| 4,384,848 A | 5/1983 | Marazzi | |
| 4,569,658 A | 2/1986 | Wiggins et al. | |
| 4,569,660 A | 2/1986 | Bossetti | |
| 4,674,975 A | 6/1987 | Corato et al. | |
| 4,739,154 A | 4/1988 | Bharara et al. | |
| 4,751,886 A | 6/1988 | Koptis et al. | |
| 4,759,298 A | 7/1988 | Koptis et al. | |
| 4,790,749 A | 12/1988 | Mauro | |
| 4,827,855 A | 5/1989 | Koptis et al. | |
| 4,850,860 A | 7/1989 | Albonetti | |
| 4,920,948 A | 5/1990 | Koether et al. | |
| 4,964,799 A | 10/1990 | Hirano | |
| 5,239,917 A | 8/1993 | Lutkie et al. | |
| 5,411,714 A | 5/1995 | Wu et al. | |
| 5,440,101 A | 8/1995 | Cox et al. | |
| 5,559,826 A | 9/1996 | Ohtani et al. | |
| 5,613,847 A | 3/1997 | Lingl | |
| 5,703,901 A | 12/1997 | Ohtani et al. | |
| 5,788,481 A | 8/1998 | Von Beckmann | |
| 5,906,485 A | 5/1999 | Groff et al. | |
| 5,913,677 A | 6/1999 | Von Beckmann | |
| 5,919,039 A | 7/1999 | Shaw et al. | |
| 6,048,199 A | 4/2000 | Dull et al. | |
| 6,126,907 A | 10/2000 | Wada | |
| 6,182,584 B1 * | 2/2001 | Gaudio | 110/229 |
| 6,244,198 B1 * | 6/2001 | Suominen | 110/342 |
| 6,250,236 B1 | 6/2001 | Feizollahi | |
| 6,623,269 B2 | 9/2003 | Tsutsui et al. | |
| 6,629,838 B1 | 10/2003 | Van Vuuren et al. | |
| 6,758,150 B2 * | 7/2004 | Ballantine et al. | 110/229 |
| 6,830,001 B1 | 12/2004 | Heran et al. | |
| 7,140,309 B2 * | 11/2006 | Behunin | 110/341 |
| 7,150,627 B2 | 12/2006 | Gaur et al. | |
| 2004/0081220 A1 | 4/2004 | Takeda | |
| 2004/0089237 A1 | 5/2004 | Pruett et al. | |
| 2004/0173239 A1 | 9/2004 | Grove-Nielsen | |
| 2004/0261672 A1 | 12/2004 | Nusimovich | |
| 2005/0074391 A1 | 4/2005 | Suominen | |
| 2006/0246391 A1 | 11/2006 | Gaur et al. | |

FOREIGN PATENT DOCUMENTS

| | | |
|---|---|---|
| DE | 2810043 A1 | 9/1979 |
| DE | 10 2005 001 569 B4 | 7/2006 |
| DE | 102005001569 A1 | 7/2006 |
| JP | 4-323009 | 11/1992 |
| JP | 6-99160 | 4/1994 |
| JP | 6-298993 | 10/1994 |
| JP | 7-33904 | 2/1995 |
| JP | 11-50338 | 2/1999 |
| JP | 11-63443 | 3/1999 |
| JP | 11-209634 | 8/1999 |
| JP | 11-290822 | 10/1999 |
| JP | 2003-192829 | 7/2003 |
| JP | 2005-307121 | 11/2005 |
| RU | 2 208 203 C2 | 7/2003 |
| WO | WO 94/15004 | 7/1994 |
| WO | WO 98/53969 | 12/1998 |
| WO | 03/089212 A1 | 10/2003 |
| WO | WO 03/089212 A1 | 10/2003 |

OTHER PUBLICATIONS

Thomas Schubert, "Recycled Carbon Fiber-Reinforced Plastics as Thermoplastic Strengtheners. Thermal Decomposition of the Matrix", Kunststoffe, Jahrg., vol. 90, No. 2, Accession No. 2000:354107, XP000936831, Feb. 1, 2000, pp. 78-82 (with English Abstract).

Kirk-Othmer, Carbon and Graphite Fibers to Chlorocarbons and Chlorohydrocarbons-$C_1$, Encyclopedia of Chemical Technology, vol. 5, pp. 599-602.

Office Action Issued Sep. 9, 2010, Application No. 09701931.9-2307.

* cited by examiner

RECYCLING CARBON FIBRE

CROSS-REFERENCE TO RELATED APPLICATIONS

The present application is a 35 U.S.C. §371 National Stage patent application of International patent application PCT/EP2009/050564, filed on Jan. 19, 2009, which claims priority to U.S. provisional patent application 61/021,953, filed on Jan. 18, 2008, and Great Britain patent application 0800940.9, filed on Jan. 18, 2008.

This invention relates to the recycling of carbon fibres used in composite materials. Carbon fibres are commonly used to make composite materials comprising woven, chopped or milled carbon fibres in a resin matrix. Such composites may be very light, strong and durable.

Carbon fibres comprise folded sheets of carbon layers. The carbon fibres are typically unreactive and are fire and corrosion resistant. Each fibre may be around 7 microns in diameter. Carbon fibre composites formed of a resin and impregnated with continuous, chopped or milled carbon fibres may have high tensile strengths and relatively low densities and hence many applications are being developed for these materials.

Production of virgin carbon fibre is in the region of 30 000 tonnes per annum and the demand for carbon fibre is significantly greater than production, such that carbon fibres are not freely available.

Whilst demand for carbon fibres is high, it has been found that there is significant wastage of material in production processes and it is estimated that as much as 40% of virgin carbon fibre and resin is wasted in manufacture of carbon fibre products. This material has traditionally been sent to landfill.

Composite materials reaching the end of their life have also been sent to landfill. These materials are, as described above, durable and generally chemically inert. Consequently carbon fibre composite materials placed in landfill can be expected to remain unchanged for a very long period of time. With the present pressure on landfill space this is undesirable. Furthermore, regulations restricting the use of landfill for composite materials are being considered and implemented.

In addition, the demand for carbon fibre is such that a means and method of recycling carbon fibre and carbon fibre composites is desirable.

Some small scale attempts at recycling carbon fibres have been made but they have been found to be complex and unsuited to larger scale production. A number of existing methods employ inert atmospheres such as nitrogen atmospheres and furthermore require extensive pre-treatment including milling and/or chemical treatment of any material to be recycled. It is known to carry out treatment of composite materials in inert atmospheres. These known methods require the use of sealed units so that the atmosphere can be purged and an inert gas introduced. Cost and complexity is introduced in such sealed furnace methods. Consequently the cost of recycling has been found to be high, the methods are complex and have resulted in an end product of limited usefulness to industry due to milling of the carbon fibre composite prior to recycling. The resulting carbon fibre material has additionally been found to have a proportion of char on or around the fibres and thus the end product is not a clean product.

A simple cost effective method of recycling carbon fibre composite materials has been sought for many years.

According to a first aspect of the invention there is provided a method of recycling composite material comprising carbon fibres and a resin, the method comprising:

providing a furnace comprising at least a heating portion;

providing a transporter for transporting the composite material through the furnace;

loading the composite material on the transporter;

removing resin in the heating portion of the furnace by means of chemical decomposition at a first temperature, with the resultant generation of fumes;

wherein the generated fumes are removed from the heating portion in a controlled manner, such that the composition in the atmosphere in the heating portion is controlled.

Specifically, according to a first aspect of the invention there is provided a method of recycling composite material comprising carbon fibres and a resin, the method comprising:

providing a furnace comprising at least a heating portion;

providing a transporter for transporting the composite material through the furnace;

loading the composite material on the transporter and transporting the composite material through the furnace;

detecting a percentage of oxygen in an atmosphere in the heating portion when the composite material has entered this portion; and removing resin from the composite material as it travels through the heating portion of the furnace on the transporter, by means of chemical decomposition at a first temperature, with the resultant generation of fumes;

wherein the generated fumes are removed from the heating portion in a controlled manner, such that the percentage of oxygen in the atmosphere in the heating portion is controlled.

Preferably, the heating portion of the furnace has an atmosphere that comprises air and the generated fume. The generated fumes (or fume) are removed from the atmosphere in the heating portion in a controlled manner such that the percentage of oxygen within the atmosphere of the heating portion is sufficiently high so as to support decomposition and combustion of the resin but low enough to minimise or avoid combustion of the carbon fibre.

Preferably chemical decomposition in the heating portion occurs at least partially by means of a flame front on the surface of the composite material. The flame front may be present across the width of the composite material as it passes through the furnace on the transporter.

The furnace may have one or more temperature zones. It will be understood that the temperature of the each zone may be varied. One or more heating elements may be provided in the or each zone. One or more heating elements in a primary heating zone may raise the composite material to a first temperature at which decomposition and combustion of the resin material can occur. Further heating elements may optionally be present in subsequent heating zones to heat the composite material to a desired temperature or to maintain the composite material at a desired temperature.

The heating elements may be selected from electrical and gas heating elements, but any elements for the provision of heat may be considered.

As the composite material reaches the first temperature decomposition and combustion occurs. Fume is generated that rises into the atmosphere of the furnace. The fume generated may reduce the percentage of oxygen present in the atmosphere.

Preferably the fume reacts with oxygen present in the atmosphere to combust further. This reaction is strongly exothermic. This exothermic reaction may be used, alone or in combination with one or more heating elements, to heat the composite material to a desired temperature or to maintain the composite material at a desired temperature.

It is further desirable to be able to measure the ratio of oxygen to fume in the atmosphere and to maintain this ratio in a range supporting decomposition of the resin and combustion of at least some of the generated fume. It is desirable to maintain the ratio of oxygen to fume so as to ensure that there is sufficient oxygen to allow combustion of the products of decomposition of the fume and to allow combustion of char from the carbon fibre. It is particularly desirable to monitor and control the oxygen/fume ratio in the first and second heating zones.

A flame front may be generated on the surface of the composite material after the composite material reaches the first temperature. Advantageously the size of the flame front can be controlled by controlling the percentage of oxygen in the atmosphere. In particular, the dimension of the flame front in the direction of travel of the composite material or width of the flame front may be controlled to be 20 cm or less, and more preferably to be 10 cm or less, such as from 1 to 9 cm, e.g. from 2 to 8 cm, for example from 3 to 7 cm, by controlling the percentage of oxygen in the atmosphere.

It is a known issue with earlier methods that the presence of any oxygen within a furnace can lead to combustion and potentially to the risk of an explosion. Accordingly there has, to date, been a mindset to ensure that the atmosphere is purged and that an inert atmosphere is used, such that combustion of the resin does not occur in the furnace.

In contrast, the present invention detects and controls the oxygen in the atmosphere in the heating portion of the furnace. As discussed in more detail below, a combination of the generated fumes and air may suitably be used in the atmosphere in the heating portion of the furnace to ensure that sufficient oxygen is present, e.g. from 1% (v/v) and up to 16% (v/v), such as from 1% (v/v) and up to 10% (v/v).

It is preferred that the transporter transports the composite material through the furnace in a substantially linear fashion. As discussed below in more detail, it is advantageous to move the composite material in a linear fashion rather than for the material to be passed around bends, or tumbled or rotated or crushed.

According to a second aspect of the invention there is provided a furnace for recycling composite carbon fibre material comprising carbon fibre and a resin component, the furnace comprising a heating portion for heating the material to a first temperature so as to remove resin by means of chemical decomposition with the resultant generation of fumes, and a transporter for transporting the composite material through the heating portion, wherein the heating portion comprises an oxygen detection means and a controller for controlling a percentage of oxygen in the atmosphere in the heating portion by controlling the removal of generated fumes from the heating portion.

Preferably the controller controls a rate of extraction of fume in response to the percentage of oxygen in the atmosphere of the heating portion of the furnace.

Preferably the furnace further comprises a loading portion. An entrance is provided between the loading portion and the heating portion. The entrance is preferably of restricted dimensions relative to dimensions of the heating portion. The entrance may be at least partially sealable so providing a variable opening. It may be desirable to be able to vary the open dimensions of the entrance to control ingress of air to the heating portion.

Preferably the furnace further comprises a cooling portion. The cooling portion may also have restricted dimensions relative to the heating portion. Air preferably may ingress the heating portion from the cooling portion.

In a preferred embodiment it is not necessary to provide fans, blowers, pumps or other positive air directing apparatus to move air into the heating portion. Preferably removal of the fume creates a natural draw. In a particularly preferred embodiment fume is removed from the heating portion to an abatement unit and draw from the abatement unit is sufficient to draw air into the heating portion.

Suitably the removal of the fume is via vents or other apertures. Natural convection assists movement of the fume to and through the vents. The size of the vents may be controlled to control the removal of the fumes from the furnace atmosphere. The length of time that the vents are open may be controlled to control the removal of the fumes from the furnace atmosphere. More detail regarding the vents is provided below.

In one embodiment, the heating portion of the furnace has an atmosphere that consists essentially of, or consists entirely of, air and the generated fumes. However, in an alternative embodiment, additional gases may be present in the atmosphere. For example, inert gases such as nitrogen or argon may be present in the atmosphere. Preferably such additional gases are present at a level of 10% (v/v) or less, such as 5% (v/v) or less, e.g. 2% (v/v) or less. In one embodiment, gases other than air and generated fumes are present at a level of from 0 to 10% (v/v), such as from 0 to 5% (v/v), e.g. from 0 to 2% (v/v).

The heating portion or first portion of the furnace may comprise a stepped heating tunnel. This portion may be arranged in alternative constructions. The form of this portion may not be a stepped form but alternative arrangements in which the atmosphere can be adequately controlled over the transporter may be utilised. In a preferred embodiment this portion has a constant height.

The first temperature, at which the resin is removed by means of chemical decomposition, may suitably be from 200° C. to 600° C. and preferably from 300° C. to 500° C., such as from 400° C. to 500° C. A most preferred range is from 425° C. to 475° C. or the temperature may be maintained at 500° C.

At this temperature resin components of the composite material break down and are burnt off the carbon fibres in a gaseous fume. The gaseous fume product of this decomposition contains relatively little oxygen. Typical levels of oxygen in the fumes are from 1% to 5% v/v.

In one embodiment the first or heating portion of the furnace is arranged such that the fume is initially retained in this first portion, reducing the proportion of oxygen present in the atmosphere of this first heating portion and preventing or reducing the possibility of oxidation of the carbon fibres and supporting decomposition of the resin component rather than combustion thereof.

It is ultimately desirable to flush fume from the first heating portion but it is also desirable to maintain enough fume within the first heating portion to minimise oxidation of the carbon fibre. Accordingly, the controlled removal of the fume is important to the invention.

Most preferably, fume removal/extraction is controlled by the use of a pressure of from −5 to +5 mbar, preferably from −2 to +2 mbar and more preferably from −2 to −1 mbar. In a preferred embodiment the pressure is −1 mbar.

In one embodiment, breakdown of the resin components is by means of pyrolysis of these components. In true pyrolysis no oxygen is present. In particular, in true pyrolysis the chemical decomposition is substantially by heat. Accordingly, substantially no reactions occur by the presence of other components; e.g. a catalyst or oxygen.

Accordingly, in one embodiment, the decomposition in the first heating portion of the furnace is carried out in the presence of substantially no oxygen.

However, in a preferred embodiment the decomposition is in the presence of low amounts of oxygen in the atmosphere of the heating portion.

In such embodiments, less than stoichiometric amounts of oxygen are present, so as to achieve chemical decomposition. In other words, the amount of oxygen present in the atmosphere of the first heating portion of the furnace is less than 100% of the amount required for combustion. For example, the amount of oxygen present in the atmosphere of the first heating portion of the furnace may be 90% or less of the amount required for combustion, such as 80% or less, 70% or less, or 60% or less.

In one embodiment, the oxygen is present in an amount of 50% of stoichiometric or less, such as 40% of stoichiometric or less, e.g. 25% of stoichiometric or less, such as 10% of stoichiometric or less.

Preferably the decomposition of the resin in the first heating portion of the furnace is carried out in the presence of oxygen in an amount of from 0.5 to 90% of stoichiometric, such as from 1 to 80% of stoichiometric, for example from 1.5 to 50% of stoichiometric, such as from 2 to 40% of stoichiometric, e.g. from 5 to 25% of stoichiometric.

In manufacture of carbon fibre, as in recycling, it is also desired to prevent oxidation of carbon fibres and this has conventionally been achieved by the use of an inert atmosphere over the carbon fibres. Typically the inert atmosphere may be nitrogen although other inert gases may be used. The use of nitrogen adds complexity and cost to the process. Some small scale laboratory attempts to recycle carbon fibre have been made and these have all used nitrogen as an inert atmosphere to prevent oxidation of the carbon fibre and to enable decomposition of the resin component to occur.

By contrast, the instant invention utilises an open furnace and controls a flow of fume out of the furnace and hence the percentage of oxygen in the atmosphere to reduce oxidation of the carbon. This is simpler and easier to control.

In the instant invention the proportion of oxygen in the atmosphere in the first portion of the furnace preferably is controlled to less than 16% (v/v), e.g. from 1% (v/v) and up to 16% (v/v). For example, it may be controlled to less than 10% (v/v), e.g. from 1% (v/v) and up to 10% (v/v). In one embodiment the proportion of oxygen in the atmosphere in the first portion of the furnace is controlled to less than 5% (v/v), e.g. from 1% (v/v) and up to 5% (v/v). In a most preferred embodiment the percentage of oxygen is less than 5% (v/v) but greater than 1% (v/v).

In one embodiment the proportion of oxygen in the atmosphere in the first portion of the furnace may be controlled so as to be from 2 and up to 16% (v/v), e.g. from 2% to 10% (v/v), such as from 2 to 5% (v/v).

In one embodiment the proportion of oxygen in the atmosphere in the first portion of the furnace may be controlled so as to be from 3 and up to 16% (v/v), e.g. from 3% to 10% (v/v), such as from 3 to 5% (v/v).

The exact proportion of oxygen selected will depend on local conditions and the material being processed, as would be appreciated by the skilled man.

In one embodiment, the proportion of oxygen in the atmosphere in the first portion of the furnace is controlled to be substantially constant throughout the furnace atmosphere, as the composite material passes through the furnace. For example, the proportion of oxygen may be controlled so that it varies by 3% (v/v) or less as the composite material passes through the furnace, such as by 2% (v/v) or less, preferably by 1% (v/v) or less, e.g. by 0.5% (v/v) or less.

It will be understood that when the furnace is first started up decomposition of the resin component may not occur as there will not be enough fume to control the atmosphere and provide a suitably oxygen poor environment. However, it will be understood that in a preferred embodiment the resin decomposes very rapidly and produces large quantities of decomposed gases or fume which provide a reducing atmosphere. This may be achieved within a few seconds of a first load of carbon fibre material entering the first heating portion.

Recycled carbon fibre reclaimed using the method of the invention has been found to have desirable properties. For example the recycled carbon fibre has been found to have improved adhesion properties compared to virgin carbon fibre. It has also been found that the electrical properties are changed in the recycling process and the conductivity may be significantly enhanced.

Preferably the fume removed from the first heating portion is directed to external burners located adjacent to the first portion. The external burners may operate at a much higher temperature than the first portion. Typically a temperature of 1000 to 1500° C. may be used, such as 1100 to 1300° C., for example in the region of 1200° C. The fume may therefore be further burnt by the external burners.

Preferably waste gases released after the fume has been burnt by the external burners are clear. Further treatment of waste gases may be incorporated in order to reduce any ecological impact of the method of recycling carbon fibres. The fume may also be condensed in order to obtain a low grade fuel oil. Alternatively the fume may be cracked back to the original polymers present in the fume. These polymers may be used in other applications such as in adhesives. Condensation or cracking of the fume may be carried out by conventional means and methods.

In a preferred embodiment the fume is treated in an abatement unit and waste gases released into the atmosphere by means of chimneys. These may be part of the abatement unit or may be separate from the abatement unit. It is also desirable to integrate the abatement unit with the furnace to facilitate energy transfer between the furnace and the abatement unit and so reduce an overall power required to be supplied to the furnace.

Preferably the transporter comprises a linear transporter. In particular, the transporter is suitably substantially linear along its length that passes through the furnace. In a preferred embodiment, the transporter is substantially linear along its entire length.

A linear transporter is particularly well adapted to transport the composite material such that the material is not rotated or crushed in transit through the furnace. It may be desirable to ensure that the composite material is not damaged or crushed in transit through the furnace. It is known that an important quality of carbon fibre is known as "cosmetic quality" and the use of a linear transporter provides a product with improved aesthetics. Additionally, if the carbon fibre is damaged then the resulting surface defects can be detrimental to the tensile strength of the carbon fibre. An advantage of using a linear transporter is that the composite material may be placed on the transporter and then moved through the furnace by the transporter with linear movement. The composite material is not rotated or crushed in movement through the furnace nor is it tumbled. Accordingly, the recycled composite material contains clean and undamaged carbon fibres after passing through the furnace.

A further advantage of this invention relates to the recycling of composite materials that are formed of laminar sheets. These may be sheets of carbon fibres only, or may also contain sheets of additional material such as sheets of reinforcing glass fibres or metal fibre. Due to the fact that the entire piece of composite material can be transported through the furnace without being pre-chopped into small pieces, and can travel without turbulence or tumbling through the furnace, the composite material cleanly delaminates into sheet layers in the heating portion of the furnace. This means that the or each sheet of additional material may be removed by lifting, sliding or pulling the sheet out from the delaminated composite material. Accordingly, metal and other materials may be easily extracted from the composite material after the material exits from the furnace.

In a preferred embodiment the composite material is loaded onto a transporter comprising a continuous feed mechanism to be transported through the heating tunnel. Preferably the continuous feed is a continuous belt and the belt may be made of steel or other heat resistant, durable material.

The belt travels through the first portion. A period of time, or dwell time, spent in the first portion may be varied by controlling a rate of movement of the belt. A control mechanism may be provided to control the rate of movement of the belt. A predetermined rate of movement may be selected. The rate of movement may be selected according to the temperature of the first portion and/or the material to be recycled. Preferably the rate of travel of the belt is controlled by means of the controller. It may be desirable to be able to vary the speed of movement of the belt during the recycling process. Such a variation may be in response to output signals from the oxygen meters and/or from temperature sensors. Examples of speeds that may be used for the belt are 2 m/min or higher, e.g. from 2 to 8 m/min, such as 3 m/min or higher, e.g. from 3 to 6 m/min. A speed of about 4 m/min may be used in one embodiment.

The belt may be arranged to transport small quantities of material. It may also be suitable for transporting larger items such as golf club shafts or rolls of woven carbon fibre. Other larger items may include such items as bicycles, racing car panels including F1 car panels, and even sections of an aircraft wing.

It is preferred that composite materials to be recycled are less than 2 m wide and less than 0.25 m high. A more preferred range is that the materials are less than 1.5 m wide and less than 0.2 m high. However, these preferred maximum sizes result from dimensions of a throat entering the preferred heating tunnel and alternative first heating portions of greater size and able to deal with larger articles of material to be recycled can be readily envisaged. The skilled man will appreciate that the height and width of an article will depend upon its orientation and that an article that in one orientation does not fit these dimensions may be able to be rotated to another orientation so as to fit these dimensions. These preferred sizes result from the dimensions of the preferred heating tunnel and the skilled man will understand that the dimensions may be varied. It is envisaged that it an alternative heating tunnel could be fabricated with alternative dimensions in which the height is closer to the width. However, it has been found that control of the dimensions of the throat are important. In a preferred embodiment it has been found that the narrower the throat the easier it is to control a heating profile within the heating portion. Alternatively the throat or opening may be adjustable to allow a larger article to enter the heating portion and the throat may then be partially or wholly closed.

A thickness of composite materials to be recycled may be varied. The thickness of the composite material may affect the ideal dwell time spent in the furnace. In general the thicker an item is the greater the dwell time.

It will be understood that there is no limit on the length of an article to be recycled since the process is continuous. However, it is preferable to cut the articles into manageable lengths in order to facilitate handling of the material to be recycled. A typical length may be in the region of 2 m.

It is a particular advantage of the method that little or no pre-treatment is required. The material to be recycled does not have to be chemically treated, or reduced to small sizes by shredding, chopping or milling. This is in part because the dimensions of the throat allow larger items to pass into the furnace.

In one embodiment, the composite materials to be recycled are only chopped or otherwise pre-treated to reduce their size if they are 1 m wide or more and/or 0.1 m high or more. In a preferred embodiment, the composite materials to be recycled are only chopped or otherwise pre-treated to reduce their size if they are 1.5 m wide or more and/or 0.2 m high or more. In one embodiment, the composite materials to be recycled are only chopped or otherwise pre-treated to reduce their size if they are 2 m wide or more and/or 0.25 m high or more.

Preferably the method is operated continuously and material can be continuously loaded onto the belt and passed into the first heating portion. An advantage of this is that it is not necessary to store material preparatory to processing a batch of material. Continuous operation of the first heating portion is also advantageous. In particular, continuous operation of the first heating portion allows the composite material to be fed into the furnace at a desired rate, dependent on the materials available. Maintenance of a continuous temperature is more energy efficient. Furthermore cycling of heat in the furnace is both inefficient and may be detrimental to the fabric of the furnace leading to a reduced life cycle. It will be understood that the batch processing of material is possible although not preferred. It has been found to be commercially undesirable at the present moment.

A second heating portion of the furnace may be provided which may preferably operate at a higher temperature than the first heating portion of the furnace.

In a preferred embodiment of the method, after resin has been removed in the first heating portion of the furnace the remaining material is heated in a second heating portion of the furnace which operates at a higher temperature than the first portion of the furnace.

Preferably the second heating portion of the furnace heats the material from 500° C. to 900° C. and more preferably from 550° C. to 800° C. Most preferably the temperature in the second portion is from 500° C. to 700° C., preferably from 550° C. to 600° C. or more preferably from 600° C. to 700° C. In one example of the method the temperature of the second heating portion is from 600° C. to 650° C., such as about 620° C.

It is desirable that the second portion of the furnace operates at a higher temperature than the first portion of the furnace. It is also preferred that the temperature of the second portion is not too high as will be further discussed below.

A minimal amount of further fume may be generated in the second portion. Any further fume may be channeled to the external burners or abatement unit and be burnt off or otherwise treated.

As the second heating portion preferably operates at a higher temperature than the first portion it has been found that the second portion burns off any char formed on fibre in the material.

Char arises from retarded decomposition of resins in the composite material. Decomposition is retarded due to an insufficient supply of oxygen. Use of an inert atmosphere excludes oxygen and therefore char is a significant problem for existing methods which use an inert atmosphere. In the instant method, however, oxygen is not excluded and so decomposition of the resin component occurs followed by combustion of the char with the oxygen present to form carbon dioxide and carbon monoxide so reducing the quantity of char remaining on the carbon fibres. A higher quality product is thus obtained.

The presence of char on or amongst carbon fibres may be undesirable since it is both an impurity and may affect the physical characteristics of the carbon fibres. Char may be seen on the surface of carbon fibres when viewed using a scanning electron microscope (SEM).

It has however been discovered that the presence of char may be desirable for certain applications of the recycled carbon fibre material, where the recycled material is to be used in an application where activated carbon is involved, for example water purification or catalytic beds.

Accordingly, it is desirable to control the removal of char from the carbon fibres so that a clean product is produced if this is desired, but equally such that a product comprising char is produced if desired.

According to a third aspect of the invention there is provided a method of recycling composite material comprising carbon fibres and a resin, the method comprising:
  providing a furnace comprising at least a first heating portion and a second heating portion;
  providing a transporter for transporting the composite material through the first heating portion;
  loading the composite material on the transporter and transporting the composite material through the furnace;
  detecting a percentage of oxygen in an atmosphere in the first heating portion when the composite material has entered this portion; and
  removing resin in the first heating portion as it travels through this portion of the furnace on the transporter, by means of chemical decomposition at a first temperature, with the resultant generation of fumes;
  removing the fumes from the first heating portion in a controlled manner, such that the percentage of oxygen in the atmosphere in the first heating portion is controlled
  transporting the material to be recycled through the second heating portion on the transporter, after being transported through the first heating portion;
  wherein the second heating portion is operated at a second temperature and the second temperature is selected to control removal of char from carbon fibres.

The second portion of the furnace operates primarily to remove char deposited on the carbon fibres in the first portion of the furnace. The amount of char deposited in the first portion is less that the amount of char deposited in processes carried out under inert atmospheres but it may still be desirable to remove as much of the char as possible. It has been found that the most preferred temperature range of from 550° C. to 600° C. is high enough to remove any char deposited on the carbon fibres without baking the char onto the carbon fibres. However a temperature in the range of from 600° C. to 650° C. may be more desirable in some embodiments. If the temperature is too high the carbon fibres can oxidise in the presence of heat and oxygen and this is not desired.

It is important to control the dwell time of the carbon fibre material in the second portion of the furnace since if the dwell time is too long the fibres reach a higher temperature and oxidise whilst if the dwell time is too short char is left on the fibres. Preferably the dwell time is in the region of 5 minutes. The thickness of the material may affect the desired dwell time in the second portion and a thicker item may require a longer dwell time. In general it has been found that a suitable dwell time is from 1 min to 10 min, such as from 2 min to 8 min, preferably from 3 min to 7 min, with a most preferred dwell time being from 4 min to 6 min. If the dwell time is too great then the carbon fibres will oxidise.

It will be appreciated that if some or all of the char is to be retained on the fibres the temperature of the second heating portion may be reduced or the dwell time may be shortened. It is desirable that the controller can control the variable of dwell time and temperature in order to control an amount of char on the carbon fibres after recycling of the composite material has been completed. Alternatively or in addition the oxygen content in the atmosphere may be controlled such that incomplete combustion of the resin or resin decomposition products occurs and a greater proportion of char is deposited on the carbon fibres.

Preferably the atmosphere in the second heating portion is substantially clear and the ratio of oxygen in the atmosphere is substantially the same as that of atmosphere. It may not be necessary to control the atmosphere in the second heating portion of the furnace. The carbon fibre may be seen to burn with a small blue flame near the surface of the carbon fibres as the char is burnt off the fibres.

The process of removal of char may be termed "polishing" or upgrading and results in fibres having a smoother surface with less adhered matter.

Preferably the method includes a step, after the heating step or steps, wherein the recycled material is cooled, for example by the use of water. This step may be carried out in a third cooling portion of the furnace. In a preferred embodiment the third cooling portion is water cooled. The material may be cooled over a period of around 15 minutes before being collected in receptacles. Typically the water cooled section is carried out using a jacketed cooling section. The cooling process is completely conventional.

Preferably receptacles are arranged to receive a continuous output of recycled material from the third cooling portion.

Preferably the receptacles are used to move the recycled material to a mill where the material may be chopped or milled in a conventional manner.

A first and/or a second buffer heating zone may be provided. The first buffer zone may be provided before the first heating portion. The first buffer zone may operate at a temperature of around 200 to 400° C. In one embodiment it may be from 200 to 300° C. In another embodiment it may be around 400° C. The exact temperature at which the first buffer zone operates may be varied but is preferably below the temperature of the first heating zone. The temperature is preferably low enough that gassing off of the resin component does not occur in the buffer zone but the material is prewarmed before entering the first heating portion and the heat in the first heating portion is retained.

In a preferred embodiment the second buffer zone is also maintained at a temperature of around 200 to 400° C. In one embodiment it may be from 200 to 300° C. In another embodiment it may be around 400° C. In a preferred embodiment the second buffer zone is located between the second heating portion and the third portion of the furnace in which cooling of the material occurs. Again, the buffer zone ids operated so as to retain heat within the first and second heating zones and to increase the overall efficiency of the furnace.

In a preferred embodiment the belt operates continuously through the furnace and moves at a substantially constant speed. It can be foreseen, however, that more than one belt could be used and material may be transferred from one belt to another. If separate belts are used then each belt may run at a different speed in each of the portions so that a dwell time in each portion may be individually varied and controlled.

Recycled material may be milled to from 50 to 500 microns and preferably from 100 to 400 microns and most preferably from 200 to 300 microns or may be chopped to lengths from 1 to 250 mm or preferably from 2 to 200 mm and most preferably from 3 to 150 mm. Alternative lengths may be selected above or below this range. Alternative lengths may be selected depending on the use to which the carbon fibres are to be put. The precise lengths selected may vary depending on the chopping equipment.

Alternatively, recycled material may be reused without chopping or milling. The separation of laminated composite material that delaminates in the heating portion has already been referred to above. At present it is envisaged that separation of delaminated material will be carried out manually but it will be appreciated that it may be automated.

Reuse without chopping or milling is particularly suited to recycling material such as woven pre-preg rolls. These materials may require recycling because the resin is no longer "in-date" but by using the described method the rolls may be returned for re-use with a fresh resin without compromising the woven structure of the carbon fibre material.

According to a fourth aspect of the invention there is provided a method of recycling composite carbon fibre material comprising carbon fibre and a resin component, the method comprising heating the composite material in an open furnace such that that the resin component undergoes thermal decomposition with resultant generation of fumes, whilst providing an atmosphere in the furnace wherein a percentage of oxygen in the atmosphere is controlled through control of the removal of the generated fumes such that thermal decomposition is substantially complete but oxidation of the carbon fibres is reduced or prevented.

Preferably a controller is provided that controls removal of fume from the furnace the controller being connected to a sensor adapted to sense the level of oxygen in the atmosphere.

Preferably the sensor comprises means of monitoring the proportion of oxygen in the atmosphere within a pre-determined range. The sensors may be arranged to sample and measure the percentage of oxygen in the atmosphere at pre-determined intervals. For example the percentage of oxygen may be sampled and measured every 30 seconds or every minute. Alternatively the sensors may sample the percentage of oxygen in the atmosphere continuously.

It may be desirable to set each sensor independently. Thus one or more sensor may sample the atmosphere continuously while one or more sensor may be set to sample the atmosphere at regular intervals, e.g. every 10 seconds or every 30 seconds. Equally, a number of sensors may be set to sample the atmosphere at regular intervals, with each sensor being independently set in terms of the interval, e.g. one sensor may be set to sample the atmosphere every 10 seconds whilst another is set to sample every 30 seconds or every minute.

The period of sampling may vary with the location of the sensor. It may be desirable to sample the atmosphere in the first heating portion continuously while sensors in the second heating zone sample periodically, for example every 5, 10, 20 or 30 seconds. Sensors in the buffer zones may sample periodically but at a longer period between samples, for example every 20, 30 or 60 seconds.

Preferably the controller controls a rate of extraction of the fumes in response to the percentage of oxygen in the atmosphere of the heating portion.

Preferably the proportion of oxygen in the atmosphere is maintained within a pre-determined range by increasing or decreasing an exit flow of the generated fume out of the first heating portion as required.

One or more vents may be provided. The or each vent may be electrically controlled to open to a preselected degree. The degree of opening may be between 0% and 100% in response to an output from the controller. Preferably more than one vent is provided in the first heating section. Advantageously one or more vents may be provided in each of the heating zones. It is preferred that each vent has a manual control mechanism. The vents may be opened and closed in response to output signals from the controller. The controller may select a degree of opening and a period for opening for the or each vent. The period of opening may be varied in response to atmospheric oxygen content measurement signals from the or each oxygen meter. In a furnace having more than one vent, each vent may operate independently of the other vents in response to signals from the controller.

A temperature sensor may also be provided to monitor the temperature reached in the heating tunnel. The temperature may be varied in proportion to a rate of travel of the transporter. Preferably a dwell time of composite material in the heating tunnel is from 3 to 15 minutes and is preferably from 5 to 12 minutes. Particularly preferred dwell times are 6 minutes and 12 minutes.

In one embodiment, the dwell time is 12 minutes or less, such as 10 minutes or less, e.g. from 1 to 10 minutes, such as 5 to 10 minutes.

The dwell time may be reduced if the temperature is increased. Alternatively if the temperature is lower the dwell time may be increased to ensure that a resin component of the composite material is burnt off. The dwell time is significantly shorter than the dwell time of known processes.

In a true pyrolytic system oxidation of the carbon cannot occur but in the instant invention a proportion of oxygen is present in the atmosphere of the first portion of the furnace and therefore some oxidation of the carbon fibres will occur. Thus in controlling the decomposition of the resin component both the temperature and the dwell time at the temperature must be considered. As the temperature increase the dwell time can be reduced in order to reduce the unwanted oxidation of carbon fibres.

In the present invention, due to the fact that the fumes are combusted, creating heat due to the exothermic reaction, the dwell time can be reduced to times significantly less than would have been predicted, e.g. 15 minutes or less, such as 12 minutes or less. By having a faster rate of travel/lower dwell time, the risk of exothermic runaway/explosion is reduced as well as the oxidation of the carbon fibres being substantially avoided.

High speeds/low dwell times are in particular made possible by the use of a linear transporter. If high speeds were used with a non linear transporter the risk of damage to the fibres would be increased significantly.

Although in a preferred embodiment the flow of gases is caused only by creating a natural draw, in an alternative embodiment a fluid mover for controlling the flow of gases through the tunnel may be provided as at least part of the controller for controlling the atmosphere in the first heating portion. This may comprise one or more fans or pumps. A motor driven gate valve may be provided together with means of drawing the fume from the first heating portion. The flow rate of gases passing through the gate valve may be controlled as previously described.

As described above an oxygen meter may also be provided to measure the percentage of oxygen in the atmosphere. Preferably the oxygen meter is located adjacent to the entry to the second zone, being the first heating zone. This is a point at which combustion is occurring and fume is evolved. The rate of fume withdrawal may be varied depending on the resin volume fraction of the composite being processed. The resin volume fraction is part of the MSDS which will be supplied with the material. The extraction will be monitored by the oxygen meter and the extract fan is controlled depending on oxygen levels.

In another embodiment an oxygen meter may be provided to measure the percentage of oxygen in the atmosphere which is located towards the middle of the second zone.

It may be that more than one oxygen meter is provided to measure the percentage of oxygen in the atmosphere, for example there may be two, three, four or more meters.

In one embodiment, there are four meters, one in each zone.

It is desirable that certain parameters such as temperature of the furnace and dwell time of the material in each portion of the furnace be pre selected before the composite material is loaded onto the transporter. This can be done if the MSDS is supplied with the material. It will be understood that this information may not always be available in which case a "best guess" of the appropriate parameters can be made. Measurement of oxygen content and temperature is carried out periodically and the percentage of oxygen in the atmosphere is controlled to maintain the oxygen content at or below 16% (v/v) by opening and closing of the vents.

It is desirable that a pressure differential be maintained between a first end of the first heating portion and a second end of the first heating portion adjacent to a second portion of the furnace. The pressure differential may be in the region of −1 mbar. However, this may be adjusted to suit local conditions. The controller for controlling the atmosphere in the first heating portion may control this pressure differential.

It is desirable that the first heating portion be arranged such that fume from the resin component is held in the first heating portion over the carbon composite material.

In one preferred embodiment the first portion is provided with a sloping roof. The roof slopes from the second portion downwards towards an "off-take" located above the throat of the first heating portion. This arrangement allows fumes from the first heating portion to be held substantially within the first portion. Air moves from the third and second portions towards the first heating portion directing fume that travels forward into the second portion to return to the first heating portion. Accordingly the second heating portion has a low level of fume and the third portion has a substantially clean atmosphere.

First, second, third and fourth portions of the furnace may refer to designated zones of a furnace rather than separate areas of the furnace.

Alternatively the furnace may be arranged such that the first and second heating portions are contiguous and buffer zones are maintained before and after the heating portions.

Extraction of the fume is therefore carefully controlled. Since the fume comprises gaseous material burnt off from the resin component, the atmosphere containing the fume is relatively low in oxygen. Reaction of carbon fibre with oxygen is therefore retarded. However it is not desirable to reduce the oxygen content to substantially zero as then decomposition and subsequent combustion of the resin content will not be able to be completed and deposition of char will be increased.

Preferably the furnace includes a second heating portion which can be heated to a second temperature that is greater than the temperature of the first portion. The dwell time of the material in the second portion of the furnace is in the region of from 3 to 5 minutes and in this portion decomposition of any remaining resin component occurs and char deposited on the carbon fibres is burnt off leaving the carbon fibres relatively clean and free of char and sizing material.

According to a fifth aspect of the invention there is provided a method of recycling composite carbon fibre material comprising carbon fibre and a resin component, the method comprising heating the composite material such that that the resin component undergoes thermal decomposition with resultant generation of fumes, whilst providing an atmosphere wherein the oxygen content is controlled through control of the removal of the generated fumes such that thermal decomposition is substantially complete but oxidation of the carbon fibres is reduced or prevented.

Preferably the fume is held over the composite material for a period of time reducing an amount of oxygen available to the carbon fibre from the atmosphere.

According to a sixth aspect of the invention there is provided a method of reducing a power required in a furnace to thermally decompose resin in a composite material comprising carbon fibres and resin wherein in the method composite material is heated in the furnace to a first temperature at which fumes are generated and a percentage of oxygen in an atmosphere in the furnace is controlled such that combustion of the fumes occurs generating heat within the furnace.

It will be appreciated that as combustion of the fume is an exothermic reaction it generates a considerable amount of energy in the form of heat. This has been a safety issue in previous methods but in controlling the amount of oxygen available in the atmosphere it is possible to control the combustion reaction and so control the heat generated. Also, in the present invention the system is not a sealed system, which reduces the danger, whereas in prior art systems a sealed furnace with an inert atmosphere was used.

In a preferred furnace heat is supplied by heating elements such as electrical elements. Other heat sources can be used as the heating elements. The amount of heat supplied by the electrical elements can be reduced in response to the heat generated from the combustion reaction. Preferably the controller is adapted to control the heat output of the electrical elements and to do so in response to temperature sensor signals.

According to a seventh aspect of the invention there is provided recycled carbon fibre resulting from a method according to a first, third, fourth, fifth or sixth aspects of the invention.

Preferably the recycled carbon fibre comprises articles formed of carbon fibre.

In an alternative embodiment the recycled carbon fibre comprises chopped carbon fibre strands. The chopped carbon fibre strands may have an un-sized finish and a proportion of char of less than 1%.

Preferably the recycled carbon fibre has improved wet-out and interfacial adhesion characteristics in forming composite materials. The characteristics may be improved over those of virgin carbon fibre. Additionally composite materials incorporating recycled carbon fibre may be found to have improved Young's modulus and tensile strength.

The invention will now be further described by way of example only with reference to the accompanying drawings in which.

Figure 1:
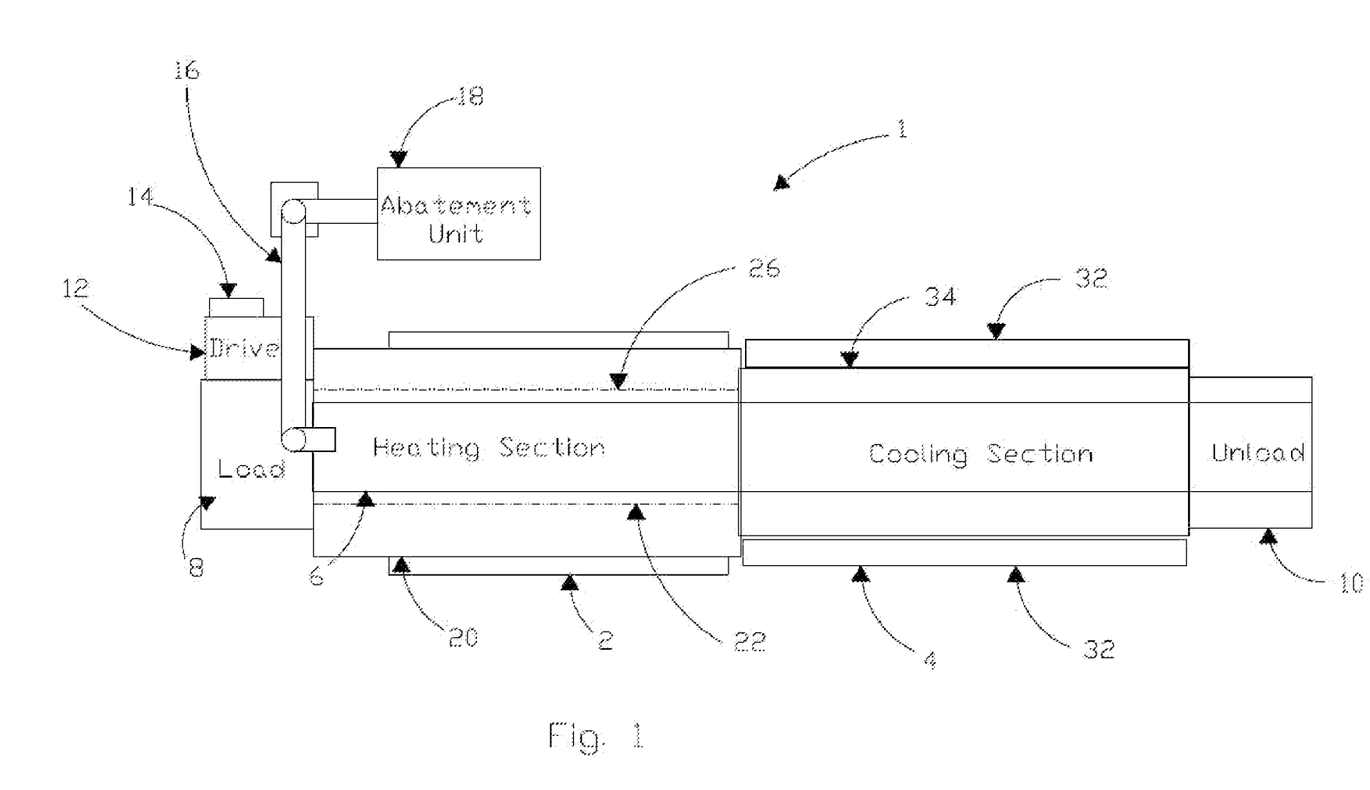
FIG. 1 is a schematic illustration of a typical layout of a furnace according to the invention.

In FIG. 1 a typical layout of a furnace 1 in accordance with the invention is illustrated. As can be seen the furnace 1 comprises two primary sections, a heating portion 2 and a cooling portion 4. A steel belt 6 is provided and arranged to pass thorough the heating portion 2 and the cooling portion 4. The belt is continuous and extends between a loading area 8 and an unloading area 10. A conventional drive means 12 is provided adjacent the loading area 8 and is arranged to drive the belt such that material loaded on the belt 6 passes through the heating portion 2 and the cooling portion 4. The drive means 12 has a control mechanism 14 that controls the rate of drive of the belt 6. The control mechanism 14 may be continuously variable or may drive the belt 6 at one of a number of predetermined speeds. The speed of the belt may be varied in accordance with a number of factors. The belt speed is varied depending on material thickness and complexity, the thicker the material the slower the belt.

The heating portion 2 is provided with at least one exhaust channel 16 connecting the heating portion to an abatement unit 18. The abatement unit comprises burners arranged to combust fumes passing through the exhaust channel and into the abatement unit. The abatement unit 18 is a unit, such as that produced by Compact Power Limited, arranged to burn off fumes and will not be further described as the form and arrangement will be well known to a man skilled in the art. The abatement unit 18 is arranged to burn off the fumes at around 1200° C. Other temperatures may be used depending on the composition the fumes. Alternative units may be substituted to process the fumes in alternative ways. Such alternative units are well understood to the man skilled in the art.

Figure 2:
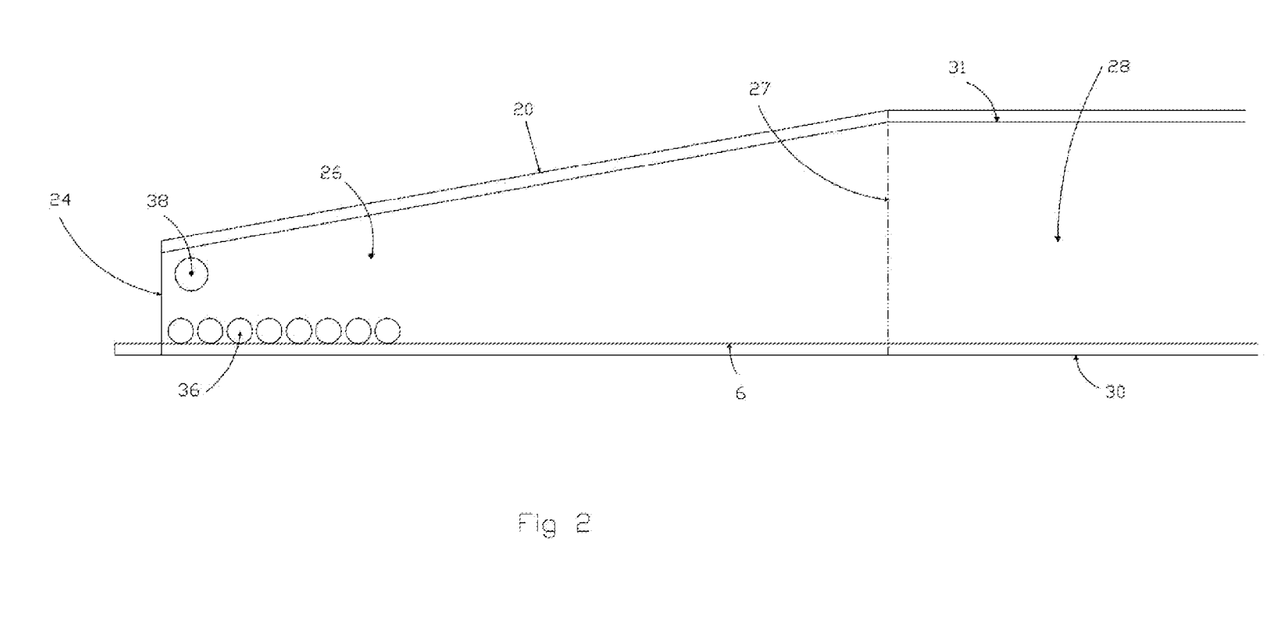
FIG. 2 shows a typical first portion of a furnace in accordance with the invention.
Figure 3:
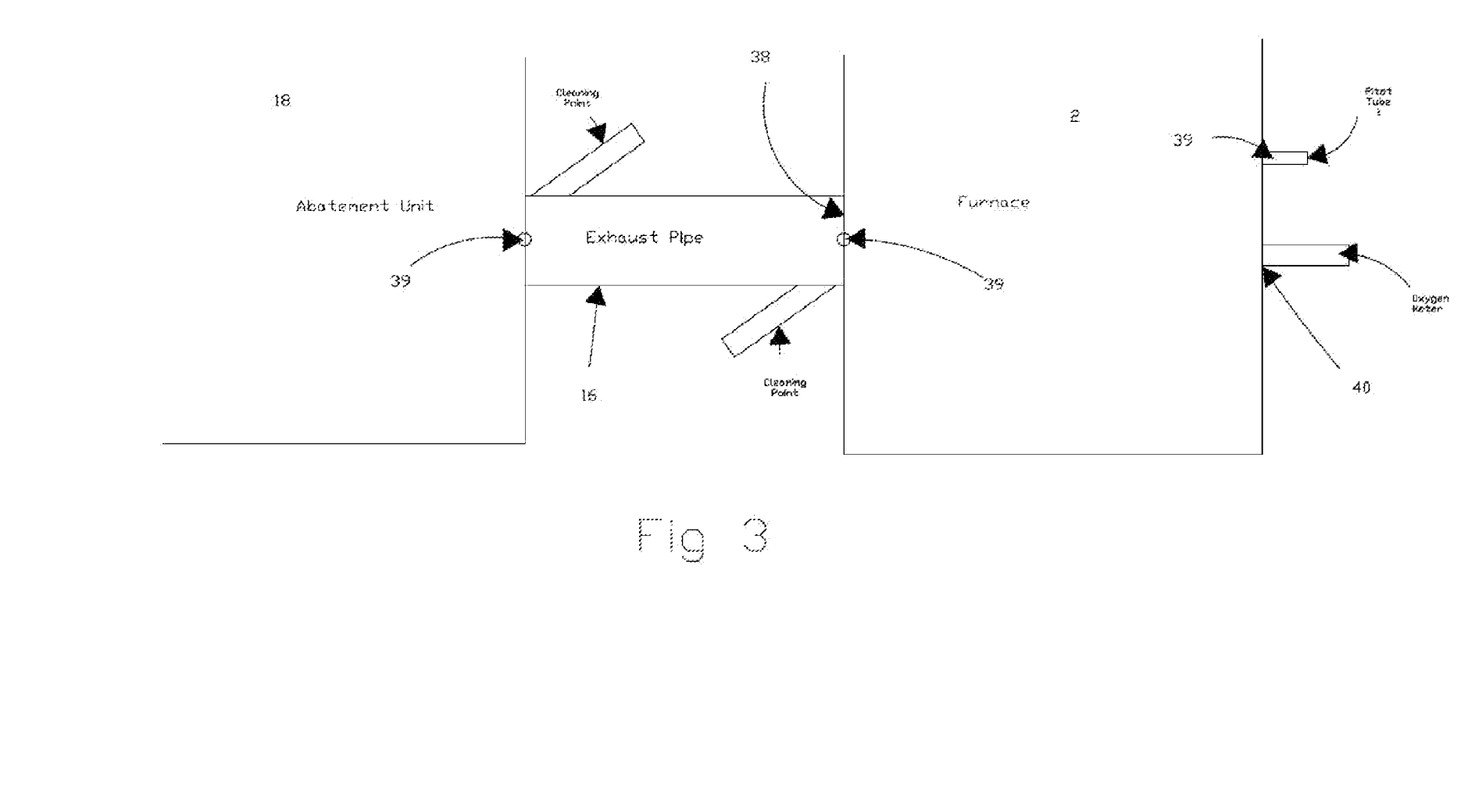
FIG. 3 is a schematic illustration of a connection between the first portion of the furnace and an abatement unit.

The heating portion 2 comprises a first heating portion including a heating tunnel 20 and a second heating portion 22. The heating tunnel 20 is illustrated in FIG. 2 and comprises a throat 24 and a passage 26 having the belt 6 running along a base of the passage. The passage extends between the throat and an entry 27 and has a sloping roof increasing in height from the throat 24 to the entry 27 to the second heating portion 22. The throat 24 is 0.25 m high and is 2 m wide. The height of the passage in this is the same through the passage and at the entry 27 to the second heating portion. The second heating portion has a chamber 28 having a base 30 and a roof 31 that is substantially the same height from the base 30 throughout the chamber of the second heating passage. The belt 6 is provided and also runs along the base 30 of the chamber 28.

The chamber 28 is connected to the cooling portion 4 and the belt runs through the chamber 28 into the cooling portion 4. The cooling portion 4 is water cooled by means of conventional water jackets 32 provided on an exterior 34 of the cooling section 4. As the location and operation of the cooling jackets is conventional these will not be further described since they will be well known to a man skilled in the art. Alternative means of cooling the cooling portion may be substituted.

The belt 6 passes from the cooling portion into the unloading section 10.

Material 36 (schematically indicated in FIG. 2) to be recycled is prepared if necessary before loading onto the belt 6 in the loading area 8. The material 36 is subjected to minimal preparation before being loaded onto the belt. It may be cut into sections such that each section is less than 0.25 m high and 2 m wide. The length of each section is not critical but is conveniently less than 2 m for ease of handling. These dimensions are a result of the dimensions of the throat of the furnace. It will be understood that the furnace may have a throat 24 having different dimensions in which case the maximum dimensions of the material to be recycled will change accordingly. A particular advantage of the invention is that material to be recycled needs little if any preparation before being loaded onto the belt 6.

The material to be recycled comprises carbon fibres in a resin composite. The resin composite may vary with the particular product being recycled. It is preferable to identify the resin component and the likely decomposition products before the material is loaded onto the belt 6 to be recycled. The temperature of the heating tunnel and/or the second heating portion may be altered as a consequence of the particular resin component. Alternatively, or as well, the drive speed of the belt may be varied.

Once the material has been loaded onto the moving belt 6 the material passes into the throat 24 of the first heating portion and into the passage 26. In the passage 26 the temperature is in the region of 450° C. to 500° C. The temperature may be changed depending on the material to be recycled. The drive speed may also be varied so that a dwell time of the material in the heating tunnel is controlled to a desired time depending on the material and the temperature of the heating tunnel. A thickness of the material to be recycled may be measured and the dwell time may be increased if the thickness is greater than say 10 mm.

As the material passes through the throat of the tunnel and into the heating tunnel the material rapidly rises in temperature and resin in the material begins to decompose emitting fumes from the material. These fumes rise from the carbon fibre material and are contained within the heating tunnel. The rate of "gassing off" is rapid at the temperature in the heating tunnel and the atmosphere is almost instantaneously filled with fumes. These fumes comprise of organic compounds and it is believed that there is little or no free oxygen in the decomposition. Consequently the fumes in the tunnel contains substantially no oxygen over the material once gassing off has started. The heating tunnel may have a sloping roof increasing in height from the throat to the entry to the second heating portion or the height may be constant. Means of controlling the atmosphere are provided in the heating tunnel. These will now be further described.

A first fan of may be conventional nature provided adjacent the entry to the second portion. In the preferred embodiment only one fan is used in the abatement unit, and is the only fan used for atmosphere control.

An entry 38 is provided in a side wall of the first portion of the furnace and connects the passage 26 to the exhaust channel 16 leading to the abatement unit 18. In the example shown the entry 38 is in a side wall. The entry may also be provided in the same wall as the throat or may comprise a part of the throat opening.

Pitot tubes 39 are provided which measure the differential pressure and provided a visual readout. If the pressure goes above −1 mbar the furnace atmosphere will contain a greater degree of oxygen, ideal pressure should be −1 mbar resulting in a slight movement of the atmosphere towards the abatement unit.

An oxygen meter 40 is provided on an opposing wall to the entry 38. The oxygen meter monitors the oxygen content in the first portion of the furnace adjacent the throat 24. The monitor operates continuously but may be arranged to sample the atmosphere on a regular basis. The period between samples may range from 1 sec to 5 minutes. A conventional oxygen monitor is used.

The only fan in the preferred embodiment is provided in the abatement unit and operates to draw fumes from the first portion of the furnace into the abatement unit.

Means of monitoring the pressure in the first portion are provided adjacent the second heating portion 28 and adjacent the entry to the exhaust channel. The pressures are monitored and transmitted to a control unit, not shown, which controls operation of the first and second fans in order to maintain a pressure differential of around −1 mbar. An output from the oxygen monitor is also inputted to the control unit. If the oxygen content of the atmosphere deviates from a desired level of between 1% and 5% (v/v) the flow rate of the fan may be varied to return the oxygen content to the desired level by decreasing the flow of fume into the exhaust channel in order to decrease the oxygen content in the atmosphere or by increasing the flow rate in order to increase the oxygen content in the atmosphere.

At least one temperature monitor is also provided to monitor the temperature in each of the heating portions and also in the cooling portion. Preferably thermocouples are fixed throughout the length of the heating zone above and below the belt. Outputs from the or each temperature monitor may also be input into the control means. The control means may be adjacent to the furnace or may be remote therefrom. Outputs from the monitors may be transmitted to a remote location and control instructions may be transmitted from the remote location to the furnace.

Temperatures of each portion are maintained in the ranges discussed previously. Ideally the first portion has a temperature of 425° C. to 475° C. The second portion 28 is maintained between 550° C. and 600° C. If the temperature is too high the carbon fibres may oxidise in too short a time.

The dwell time is also controlled and may be varied depending on the temperatures of the heating portions. As the temperature is increased the dwell time may be decreased in order to avoid undesirable oxidation of the fibres.

An extract fan is provided in the second heating portion 28 and is connected to another exhaust pipe (not shown) communicating between the second heating channel and the abatement unit. A small amount of further fume may be generated in this second heating portion and is also burnt off in the abatement unit.

The cooling portion 4 is approximately 8 m long and provides a region in which the carbon fibre may be slowly cooled to ambient temperature to make the material handleable at the end of the process. The length of the cooling portion may be varied depending on the speed of the belt.

The cooling portion is conventional and the form may be altered or adapted in ways obvious to a man skilled in the art.

Once the carbon fibre material has cooled it enters the unloading area 10 and is unloaded from the belt. The material is collected in hoppers and transported to a finishing area. The material may be finished by milling the fibre to between 200 and 300 microns or the fibres may be chopped to lengths between 3 and 150 mm.

Some material may be recycled without chopping or milling. A particular example is woven pre-preg rolls in which the resin has become out of date. The rolls may be passed through the furnace and then be re-impregnated with resin without compromising the woven structure of the cloth.

Figure 4:
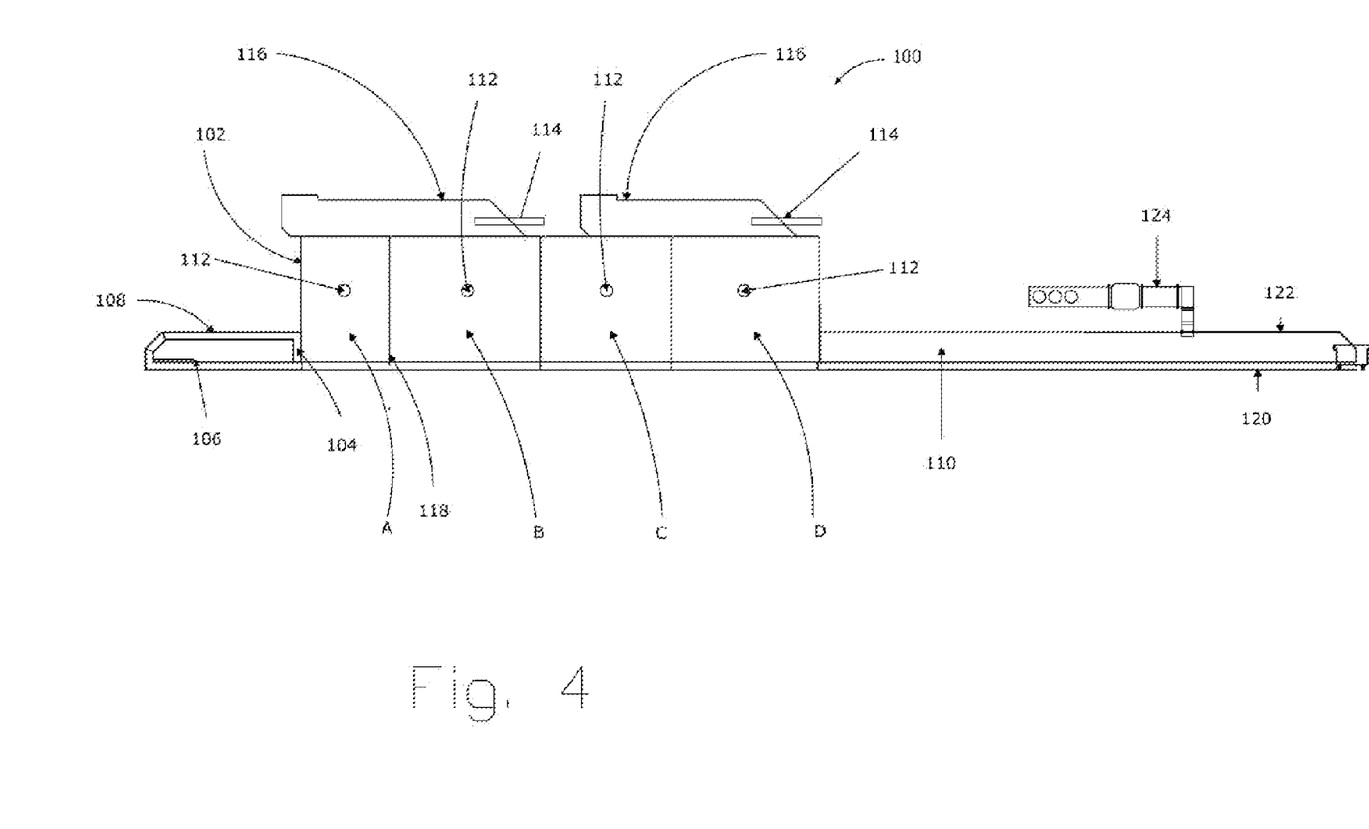
FIG. 4 is a cross section of an alternative furnace.

An alternative furnace will now be described with reference to FIG. 4. The furnace 100 comprises a single chamber 102. A gate or throat 104 is provided at a first end of the chamber 102. A belt 106 passes from a charging table 108 through the throat 104 and into the chamber 102. Material to be recycled is place on the belt 106 at the charging table 108. As before the material to be recycled is generally untreated before being placed on the belt. In some cases it may be necessary to cut the material to reduce overall dimensions so as to pass through the throat. In this furnace the gate dimensions can be enlarged or reduced. The gate can be enlarged in order to allow larger items of material to be recycled to pass through the gate. It is also advantageous to be able to reduce the dimensions of the gate in order to control a flow of air entering the chamber 102 by means of the gate. Typically the throat is approximately six inches in height and 2 m across. It is possible to reduce the height of the throat by lowering an internal gate in front of the throat or by using variable doors.

After passing through the chamber 102 the belt enters a cooling portion 110. The overall length dimensions of the chamber 102 and cooling portion 110 are similar to those of the furnace previously described.

The chamber 102 is open and air can enter the chamber by means of the gate 104 and the cooling portion 110. The belt moves at several meters per minute and it is envisaged that speeds up to 8 m per minute could be used. A typical belt speed is from 1 to 4 metres per minute.

In this furnace the chamber 102 can be considered to comprise of four zones A to D. Zones A and D are buffer zones and are maintained at a temperature which is below that of Zones B and C which comprise first and second heating portions. Typically the temperature at the entrance of Zone B, the first heating portion of the chamber, is maintained at from 425 to 450° C. The exact temperature of Zone B may be varied depending on the thickness of the material to be recycled and the composition of the resin in the composite material to be recycled. Zone B may have a higher temperature as it approaches Zone C, for example Zone B may be ramped from a temperature at its entrance of from 425 to 450° C. to a temperature at its exit of from 500 to 650° C. Zone C comprises a second heating portion and is generally maintained at a higher temperature than that of the entrance to Zone B. It has been found that a temperature of about 600° C. to 650° C. is usually suitable. Polishing or removal of char generally occurs in Zone C. The exact temperature of Zone C may be varied to control the quantity of char remaining on the carbon fibre. Typically Zone C is maintained at a temperature of between 500° C. and 700° C. The temperature of zone C is conveniently set to 620 C. The buffer zones A and D are maintained at a temperature from 200 C to 400 C. As described above, it may be desirable to maintain at least some char on the recycled carbon fibre depending on the proposed use of the recycled carbon fibre.

Heating elements (not shown) are provided throughout the chamber 102 in order to provide heat input into the chamber as required. In this embodiment the heating elements are electrical elements but it will be understood that alternative sources of heat can be used in the chamber. An example of an alternative source of heat is a gas burner.

A number of temperature sensors are provided in the chamber. The temperature sensors are located in each zone. Two temperature sensors are provided in each zone in this furnace. In this furnace the temperature sensors are located adjacent to heating elements provided in the furnace. The or each temperature sensor is arranged to output data indicative of the temperature to a controller (not shown).

A number of exhaust vents 112 are provided in the chamber. In this furnace an exhaust vent is provided in each zone. More than one exhaust vent may be provided in each zone or it may not be necessary to provide an exhaust vent in each of the zones. Each of the exhaust vents is connected to an abatement unit. In this furnace the abatement unit 116 comprises burners 114 which combust the waste gases from the chamber. Further burners are provided but are not indicated in FIG. 4. The abatement unit is conventional in the burning of gases to reduce the environmental effect of gases emitted from the furnace. In this furnace the abatement unit burners burn the gas at between 800° C. and 1200° C. The waste gases are transferred to a chimney (not shown) to cool and release gases to the atmosphere. Release of gases to the atmosphere from the chimney creates a natural draw which moves gases through the abatement unit and when the exhaust vents 112 are open also draws fume from the chamber 102 into the abatement unit 116.

The exhaust vents are provided with control mechanisms that control opening and closing of the vents. The vents may be opened to a degree that may vary between 0° and 100°. The control mechanism may be set to open the or each vent for a period that varies between 0 and 30 seconds. The vents may be arranged to be open for a longer period of time if the conditions in the chamber require it in order to maintain the correct balance of fume and air. When the or each exhaust vent is open, the draw from the chimney draws fume from the chamber into the abatement unit. Thus fume is removed and air from outside the chamber is drawn into the chamber by means of the gate and the cooling portion. As air is drawn into the chamber the percentage of oxygen in the atmosphere is increased and further combustion of the resin and decomposition products is encouraged.

An oxygen sensor is provided in each zone. In this furnace the oxygen sensors are provided in a central portion of each zone but in other designs the sensors may be located at a beginning of each zone. The oxygen sensors can be arranged to sample the atmosphere continuously or periodically and this may be set by the controller. It is desired to maintain the percentage of oxygen in the atmosphere in less than stoichiometric amounts of oxygen, so as to achieve chemical decomposition. In other words, the amount of oxygen present in the atmosphere of the first heating portion of the furnace is less than 100% of the amount required for combustion.

The proportion of oxygen in the atmosphere in the first heating portion of the furnace is preferably controlled to less than 16% (v/v), e.g. from 0.5% (v/v) and up to 16% (v/v). It is generally preferred to maintain the percentage of oxygen at less than 5% (v/v) but greater than 1% (v/v). The exact percentage of oxygen in the atmosphere may vary with the composite material to be recycled.

If the oxygen content of the atmosphere deviates from a desired level of between 1% and 5% (v/v) the exhaust vents may open for a period of time to return the oxygen content to the desired level. The vents may be closed to decrease the flow of fume into the abatement unit in order to decrease the oxygen content in the atmosphere or may be opened to increase the flow rate to the abatement unit so increasing the oxygen content in the atmosphere.

When the exhaust vents are closed, fume is not removed from the chamber and air is not drawn into the chamber from outside the furnace. Fume builds up in the chamber and reduces the percentage of oxygen in the atmosphere of the chamber. Decomposition of the resin continues but there is reduced combustion of the decomposition products and reduced combustion of the carbon fibre in the material.

Opening and closing of the vents is performed to ensure that the percentage of oxygen in the atmosphere is maintained in the desired range to enable decomposition and combustion of the fume to occur but to reduce oxidation of the carbon fibre. The natural draw of the chimneys removes the fume without the use of fans or other fluid transmission apparatus to move air into the chamber. Sufficient draw on the chamber must be provided to prevent fume from being released from the chamber by the gate or the cooling portion.

Pitot tubes are provided, as before, which measure the differential pressure and provided a visual readout. If the pressure goes above −1 mbar the furnace atmosphere will contain a greater degree of oxygen, ideal pressure should be −1 mbar resulting in a slight movement of the atmosphere towards the abatement unit.

In this embodiment the abatement unit is located on and around the chamber 102, rather than being provided as a separate unit. Accordingly there is an advantageous exchange of heat between the chamber and the abatement unit which reduces the energy required to process the composite material. The abatement unit typically uses gas burners to raise the temperature of the fume and combust the gases therein. The gas burners are provided with a supply of air and fans supply the burners with the air in a conventional manner.

Material on the belt 106 passes through the gate and into zone A. The temperature of the material is rapidly raised to the temperature of zone A which is generally between 200 and 300° C. and the material passes into zone B, the first heating zone. The temperature of zone B is approximately 425-450° C. As the material reaches this temperature, decomposition of the resin begins to occur and combustion of the decomposition products with the oxygen in the atmosphere also occurs. It has been found that a visible flame front 118 occurs in the carbon fibre material. The flame front 118 is generally linear and extends across the belt. The width of the flame front, i.e. the extent to which the flame front extends in the direction of travel of the belt, may be between 5 cm and 20 cm depending on appropriate adjustment of belt speed, temperature and percentage of oxygen in the atmosphere. An exact width of the flame front varies with the temperature and speed of movement of the belt. These variables can be adjusted to control the forward width of the flame front to a desired width. It will be understood that if the flame front is too wide, that is the size of the flame front is too great in the direction of travel of the belt, then unwanted combustion of the carbon fibres can occur. On the other hand, if the flame front is not wide enough it is found that not all the resin is decomposed and further treatment of the composite material is required.

It is believed that the presence of a flame front is unique to the instant invention since in other recycling methods the atmosphere is substantially inert so that no combustion can occur and indeed the risk of an explosion has taught that oxygen should be removed from the atmosphere. Other known methods raise the temperature very slowly and it is thought that decomposition occurs without active combustion and the presence of a flame. It has been found that as the composite material passes linearly through the flame front all the material is consistently raised to a similar temperature and the resulting carbon fibre has consistent physical properties. Other methods have been found to have produced material that may have variable properties which is not as desirable.

Once the fume is generated the atmosphere is controlled as described above. The material on the belt passes through the first heating portion comprising zone B and enters the second heating portion of zone C. The second heating portion is not physically separated from zone B but is maintained at a higher temperature, typically 600 to 650° C. Relatively fewer fumes are generated in this portion and the percentage of oxygen in the atmosphere is higher than that in the first heating zone. Further combustion occurs in this zone and the char remaining on the carbon fibre is burnt off. A bluish flame can be seen on the carbon fibre material as the char is burnt off and a clean carbon fibre is produced.

The temperatures of the first and second heating portions are higher than the corresponding temperatures of the first embodiment described. The speed of the belt is greater and so the dwell time in the first and second heating portions is reduced. In general a dwell time of about 4 to 6 minutes in the first heating zone and about a further 4 to 6 minutes in the second heating zone has been found to produce desired results, although even lower dwell times than this may be suitable.

The material passes from the second heating portion, zone C, to zone D which is a buffer zone and cooling of the material commences. Zone D is maintained at a temperature between 200 and 400° C. The atmosphere in zone D is relatively clear of fume. The belt transports the material from zone D into the cooling portion 110 which is cooled in a conventional manner. The belt 106 arrives at 120 at a discharge table 122. The belt passes below a suction unit 124 which operates to remove any fly from the recycled material. The fly is formed by carbonised char and carbon fibres and is removed and filtered to prevent contamination of the surrounding area. It has been found that there is relatively little fly produced compared to existing methods, as the material is largely uncut before entering the furnace and is transported on the belt without being cut, abraded or tumbled. The resulting carbon fibre in the recycled material is consequently of higher cosmetic quality than that resulting from methods in which the carbon fibre material is cut or milled before treatment or is rotated, crushed or tumbled or impacted in passing around bends in the recycling process thus damaging the fibre.

As has been referred to above, the composite carbon fibre material can be delivered from the end of the belt into receptacles. Alternatively if laminar material has passed through the furnace it can be removed from the belt and manually delaminated.

The invention claimed is:

1. A method of recycling a composite material comprising carbon fibers and a resin, wherein the method comprises:
   providing a furnace having at least a heating portion;
   loading the composite material on a transporter and transporting the composite material through the furnace;
   detecting a percentage of oxygen in an atmosphere in the heating portion when the composite material has entered the heating portion; and
   removing at least a portion of the resin from the composite material, as the composite material travels through the heating portion of the furnace on the transporter, by a thermochemical decomposition at a first temperature, with a resultant generation of fumes, wherein the fumes are removed from the heating portion in a controlled manner such that the percentage of oxygen in the atmosphere in the heating portion is controlled, with a rate of removal of the fumes being controlled so as to ensure that there is oxygen present in the heating portion in a controlled amount, such that the thermochemical decomposition of the resin occurs in the presence of oxygen.

2. The method according to claim 1, wherein in said removing, the thermochemical decomposition at the first temperature in the heating portion occurs at least partially by a flame front on a surface of the composite material.

3. The method according to claim 2, wherein said removing includes controlling a dimension of the flame front in a direction of travel of the composite material to be 10 cm or less by controlling the percentage of oxygen in the atmosphere in the heating portion.

4. The method according to claim 1, wherein said transporting includes transporting the composite material through the furnace in a manner such that the composite material is not rotated, tumbled, crushed, impacted, or passed around bends during transport through the furnace.

5. The method according to claim 1, wherein the transporter comprises a linear transporter.

6. The method according to claim 1, wherein said detecting includes detecting the percentage of oxygen in the atmosphere periodically or continuously.

7. The method according to claim 1, wherein said providing includes providing in the furnace at least one vent, suitable for removing the fumes from the heating portion.

8. The method according to claim 7, wherein said providing includes controlling at least one vent to be openable to a degree that may be varied between 0 and 100%.

9. The method according to claim 8, wherein said controlling includes controlling the degree to which the at least one vent is opened by a controller in response to the percentage of oxygen present in the atmosphere.

10. The method according to claim 9, wherein the at least one vent is opened to a selected degree for a predetermined length of time or for a length of time that is controlled by the controller in response to the percentage of oxygen present in the atmosphere.

11. The method according to claim 7, wherein the fumes are drawn through the at least one vent in an open position by a natural draw acting on the fumes.

12. The method according to claim 1, wherein the fumes removed from the heating portion are treated in an abatement unit to produce a waste gas that is released into the atmosphere via a chimney.

13. The method according to claim 12, wherein the abatement unit is integrated with the furnace to facilitate energy transfer between the abatement unit and the furnace, to reduce a requisite amount of power to be supplied to the furnace.

14. The method according to claim 1, wherein the fumes undergo an exothermic combustion reaction with oxygen in the atmosphere in the heating portion of the furnace, to reduce a requisite amount of power to be supplied to the furnace.

15. The method according to claim 1, wherein the percentage of oxygen in the atmosphere in the heating portion is detected and then controlled to remain within 1-16 vol. % by controlling the removal of fumes generated from the heating portion.

16. A method of recycling a composite material comprising carbon fibers and a resin, wherein the method comprises:
   providing a furnace comprising a first heating portion and a second heating portion;
   loading the composite material on a transporter and transporting the composite material through the furnace;
   detecting a percentage of oxygen in an atmosphere in the first heating portion when the composite material has entered the first heating portion;
   removing at least a portion of the resin from the composite material in the first heating portion of the furnace, as the composite material travels through the first heating portion of the furnace on the transporter, by a thermochemical decomposition at a first temperature, with a resultant generation of fumes, wherein the fumes are removed from the first heating portion in a controlled manner such that the percentage of oxygen in the atmosphere in the first heating portion is controlled, with a rate of removal of the fumes being controlled so as to ensure that there is oxygen present in the first heating portion in a controlled amount, such that the thermochemical decomposition of the resin occurs in the presence of oxygen; and removing at least a portion of char from the carbon fibers obtained from the first heating portion by a thermochemical decomposition at a second temperature that is carried out in the second heating portion, wherein the second temperature is selected to control removal of char from the carbon fibers.

17. A method of recycling a composite material comprising carbon fibers and a resin, wherein the method comprises:
providing an open furnace having an atmosphere comprising a percentage of oxygen;
heating the composite material in the open furnace such that the resin undergoes thermochemical decomposition with a resultant generation of fumes; and
controlling the percentage of oxygen in the atmosphere by controlling a rate of removal of the fumes generated by the thermochemical decomposition, wherein the rate of removal of the fumes is controlled so as to ensure that there is oxygen present in the atmosphere of the open furnace in a controlled amount, such that the thermochemical decomposition of the resin occurs in the presence of oxygen and is substantially complete but oxidation of the carbon fibers is reduced or prevented, wherein the thermochemical decomposition occurs in the presence of a flame front.

18. The method according to claim 17, wherein a dimension of the flame front in a direction of travel of the composite material through the open furnace is controlled to be 10 cm or less by controlling the percentage of oxygen in the atmosphere.

19. The method according to claim 17, wherein the composite material is transported through the open furnace on a linear transporter.

* * * * *